United States Patent
Liao

(10) Patent No.: US 9,274,314 B2
(45) Date of Patent: Mar. 1, 2016

(54) IMAGING LENS, AND PORTABLE ELECTRONIC APPARATUS INCLUDING THE SAME

(71) Applicant: Genius Electronic Optical Co., Ltd., Taichung (TW)

(72) Inventor: Chen-Cheng Liao, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 191 days.

(21) Appl. No.: 14/101,514

(22) Filed: Dec. 10, 2013

(65) Prior Publication Data

US 2014/0218585 A1 Aug. 7, 2014

(30) Foreign Application Priority Data

Feb. 6, 2013 (TW) .............................. 102104614 U

(51) Int. Cl.
*G02B 13/00* (2006.01)
*G02B 9/60* (2006.01)

(52) U.S. Cl.
CPC .............. *G02B 13/0045* (2013.01); *G02B 9/60* (2013.01)

(58) Field of Classification Search
None
See application file for complete search history.

(56) References Cited

U.S. PATENT DOCUMENTS

| 7,502,181 | B2 | 3/2009 | Shinohara | |
|---|---|---|---|---|
| 7,826,151 | B2 | 11/2010 | Tsai | |
| 7,864,454 | B1 * | 1/2011 | Tang et al. | 359/764 |
| 7,911,711 | B1 * | 3/2011 | Tang et al. | 359/764 |
| 8,000,030 | B2 | 8/2011 | Tang | |
| 8,000,031 | B1 * | 8/2011 | Tsai | 359/714 |
| 8,189,273 | B2 | 5/2012 | Noda | |
| 2007/0229984 | A1 * | 10/2007 | Shinohara | 359/763 |
| 2009/0290241 | A1 * | 11/2009 | Huang et al. | 359/824 |
| 2010/0134904 | A1 * | 6/2010 | Tsai | 359/764 |
| 2010/0265593 | A1 * | 10/2010 | Tang | 359/663 |
| 2010/0315723 | A1 | 12/2010 | Noda | |
| 2012/0092778 | A1 * | 4/2012 | Tsai et al. | 359/714 |
| 2012/0147482 | A1 | 6/2012 | Tsai | |
| 2014/0340765 | A1 * | 11/2014 | Tsai et al. | 359/714 |
| 2014/0362454 | A1 * | 12/2014 | Tsai et al. | 359/714 |

FOREIGN PATENT DOCUMENTS

| CN | 101782676 A | 7/2010 |
|---|---|---|
| CN | 102313970 A | 1/2012 |
| CN | 102483504 A | 5/2012 |
| JP | 2010048996 A | 3/2010 |

(Continued)

OTHER PUBLICATIONS

Search Report appended in an Office action issued to Taiwanese counterpart application No. 102104614 dated Jul. 18, 2014 along with English translation.

*Primary Examiner* — Dennis Hogue
(74) *Attorney, Agent, or Firm* — Baker & McKenzie LLP

(57) ABSTRACT

An imaging lens includes an aperture stop, first, second, third, fourth and fifth lens elements arranged from an object side to an image side in the given order. The first lens element has a positive refractive power. The second lens element has an image-side surface with a concave portion in a vicinity of a periphery. The third lens element has an object-side surface with a concave portion in a vicinity of a periphery. The fourth lens element has an object-side surface with a convex portion in a vicinity of a optical axis. The fourth lens element and the fifth lens element have an image-side surface with a concave portion in a vicinity of a optical axis. The fifth lens element is made of a plastic material.

16 Claims, 19 Drawing Sheets

(56) References Cited

FOREIGN PATENT DOCUMENTS

| | | |
|---|---|---|
| JP | P2010-48996 A | 3/2010 |
| JP | P2012-037763 A | 2/2012 |
| JP | P2014-123034 A | 7/2014 |
| TW | 201007340 A | 2/2010 |
| TW | 201106040 A | 2/2011 |
| TW | 201137430 A | 11/2011 |
| TW | 201144890 A | 12/2011 |
| WO | 2013014850 A1 | 1/2013 |
| WO | 2013175783 A1 | 11/2013 |
| WO | 2014045686 A1 | 3/2014 |
| WO | 2014050476 A1 | 4/2014 |

* cited by examiner

FIG. 3

| system focal length=3.79mm, half field-of-view=36.00°, F-number=2.45, system length=4.92mm ||||||||
|---|---|---|---|---|---|---|---|
| lens element | surface | radius of curvature | thickness | refractive index | Abbe number | material | focal length |
| object | | ∞ | ∞ | | | | |
| aperture stop 2 | | ∞ | -0.100 | | | | |
| first lens element 3 | object-side surface 31 | 1.964265 | 0.797 | 1.544919 | 55.92994 | plastic | 2.746 |
| | image-side surface 32 | -5.381 | 0.055899 | | | | |
| second lens element 4 | object-side surface 41 | 9.737848 | 0.218001 | 1.639800 | 23.26587 | plastic | -6.11 |
| | image-side surface 42 | 2.765173 | 0.662585 | | | | |
| third lens element 5 | object-side surface 51 | -1.32042 | 0.790639 | 1.525279 | 55.95076 | plastic | 2.891 |
| | image-side surface 52 | -0.85192 | 0.050088 | | | | |
| fourth lens element 6 | object-side surface 61 | 5.735116 | 0.402051 | 1.491756 | 57.44079 | plastic | -5.428 |
| | image-side surface 62 | 1.779309 | 0.186323 | | | | |
| fifth lens element 7 | object-side surface 71 | 2.225794 | 0.362441 | 1.585470 | 29.90919 | plastic | -7.491 |
| | image-side surface 72 | 1.387692 | 0.36 | | | | |
| optical filter 8 | object-side surface 81 | ∞ | 0.21 | | | | |
| | image-side surface 82 | ∞ | 0.821074 | | | | |
| image plane 9 | | ∞ | 0.000 | | | | |

| surface | 31 | 32 | 41 | 42 | 51 | 52 | 61 | 62 | 71 | 72 |
|---|---|---|---|---|---|---|---|---|---|---|
| K | -2.32E+00 | 1.64E+00 | 6.23E+01 | 1.22E+00 | -4.55E+00 | -1.49E+00 | -3.30E+02 | -1.09E+01 | -6.47E-01 | -6.42E+00 |
| $a_4$ | 5.01E-03 | -1.39E-01 | -1.07E-02 | 1.13E-01 | -2.83E-01 | 2.65E-02 | 5.54E-02 | -1.24E-02 | -1.19E-01 | -5.63E-02 |
| $a_6$ | -4.63E-02 | 4.00E-02 | -4.09E-02 | -7.55E-02 | 2.83E-01 | -3.12E-02 | -2.88E-02 | 5.77E-03 | 2.42E-02 | 9.62E-03 |
| $a_8$ | 2.03E-02 | -1.06E-01 | -1.15E-01 | 2.82E-02 | -9.27E-02 | 3.92E-03 | 4.37E-03 | -4.62E-03 | -1.48E-03 | -7.83E-04 |
| $a_{10}$ | -7.14E-02 | 1.26E-01 | 3.14E-01 | 2.10E-02 | -1.24E-01 | 2.42E-02 | 3.94E-04 | 1.16E-03 | -1.59E-04 | 2.16E-04 |
| $a_{12}$ | 2.82E-02 | -5.23E-02 | -1.76E-01 | 3.72E-02 | 2.25E-01 | -8.44E-03 | -2.64E-04 | -1.30E-04 | 2.30E-05 | -4.40E-05 |
| $a_{14}$ | -2.80E-02 | -2.06E-02 | 1.54E-02 | -3.48E-02 | -1.16E-01 | -7.38E-04 | 2.63E-05 | 3.86E-06 | -9.36E-07 | 2.54E-06 |
| $a_{16}$ | 3.65E-03 | 3.26E-03 | -5.76E-03 | -1.65E-03 | -2.51E-03 | -7.33E-05 | -1.42E-07 | -3.49E-08 | -2.84E-09 | -3.87E-09 |

FIG. 4

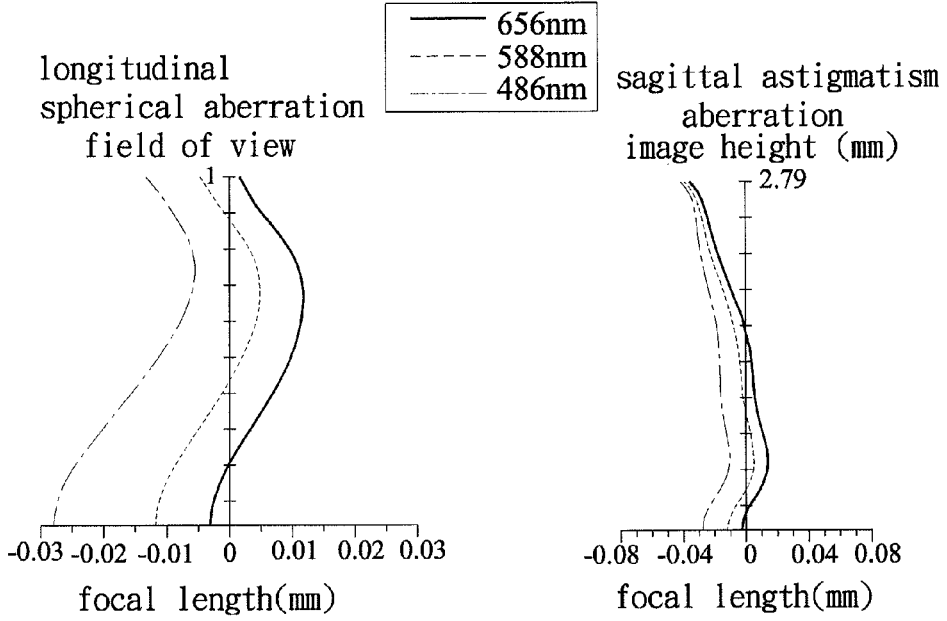
FIG. 5(a)
FIG. 5(b)
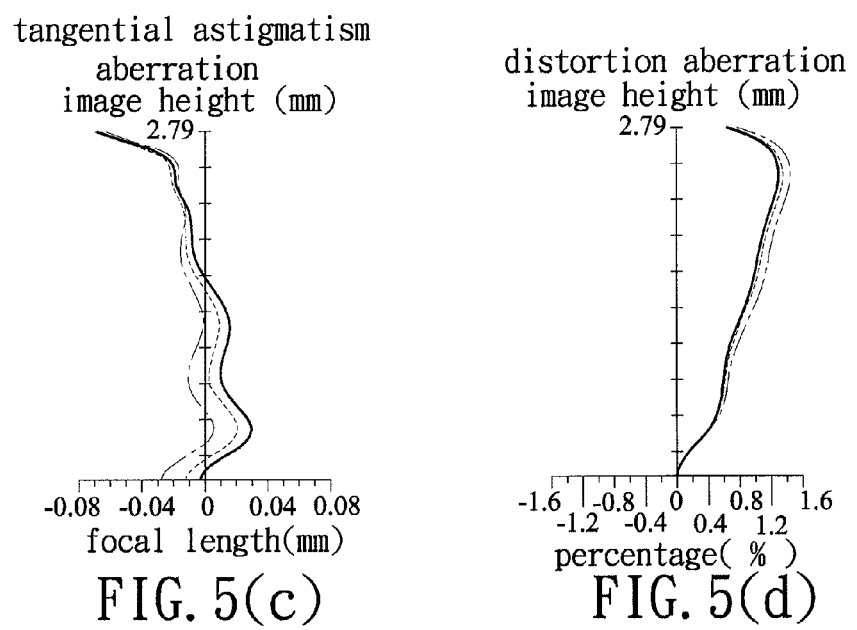
FIG. 5(c)
FIG. 5(d)

FIG. 7 system focal length=4.06mm, half field-of-view=33.00°, F-number=2.70, system length=5.05mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.100 | | | | |
| first lens element 3 | object-side surface 31 | 2.109972 | 1.252451 | 1.544919 | 55.92994 | plastic | 2.824 |
| | image-side surface 32 | -4.54453 | 0.03 | | | | |
| second lens element 4 | object-side surface 41 | 12.12769 | 0.30935 | 1.637460 | 23.23102 | plastic | -6.187 |
| | image-side surface 42 | 2.963556 | 0.630618 | | | | |
| third lens element 5 | object-side surface 51 | -1.38233 | 0.649802 | 1.525279 | 55.95076 | plastic | 3.137 |
| | image-side surface 52 | -0.87493 | 0.06747 | | | | |
| fourth lens element 6 | object-side surface 61 | 5.078335 | 0.329807 | 1.525279 | 55.95076 | plastic | -5.61 |
| | image-side surface 62 | 1.826813 | 0.11466 | | | | |
| fifth lens element 7 | object-side surface 71 | 2.061241 | 0.279797 | 1.585470 | 29.90919 | plastic | -6.098 |
| | image-side surface 72 | 1.243751 | 0.41 | | | | |
| optical filter 8 | object-side surface 81 | ∞ | 0.21 | | | | |
| | image-side surface 82 | ∞ | 0.762506 | | | | |
| image plane 9 | | ∞ | 0.000 | | | | |

| surface | 31 | 32 | 41 | 42 | 51 | 52 | 61 | 62 | 71 | 72 |
|---|---|---|---|---|---|---|---|---|---|---|
| K | -1.98E+00 | 9.79E-02 | 4.49E+01 | 1.37E+00 | -4.50E+00 | -1.56E+00 | -2.66E+02 | -9.59E+00 | -6.31E-01 | -6.21E+00 |
| $a_4$ | 9.05E-03 | -1.36E-01 | -1.27E-02 | 1.15E-01 | -2.91E-01 | 2.98E-02 | 5.35E-02 | -7.26E-03 | -1.20E-01 | -5.10E-02 |
| $a_6$ | -3.65E-02 | 4.38E-02 | -4.49E-02 | -7.37E-02 | 2.79E-01 | -3.12E-02 | -2.74E-02 | 5.36E-03 | 2.45E-02 | 8.96E-03 |
| $a_8$ | 3.58E-02 | -9.72E-02 | -1.22E-01 | 2.85E-02 | -9.71E-02 | 3.46E-03 | 4.59E-03 | -4.53E-03 | -1.47E-03 | -7.43E-04 |
| $a_{10}$ | -4.95E-02 | 1.39E-01 | 3.07E-01 | 1.91E-02 | -1.26E-01 | 2.37E-02 | 4.16E-04 | 1.19E-03 | -1.58E-04 | 2.22E-04 |
| $a_{12}$ | 5.33E-02 | -3.52E-02 | -1.81E-01 | 3.45E-02 | 2.23E-01 | -8.95E-03 | -2.60E-04 | -1.28E-04 | 2.34E-05 | -4.36E-05 |
| $a_{14}$ | -1.94E-02 | -1.73E-02 | 1.93E-02 | -3.65E-02 | -1.14E-01 | -1.14E-03 | 2.68E-05 | 3.97E-06 | -8.84E-07 | 2.62E-06 |
| $a_{16}$ | -4.74E-02 | -2.46E-03 | -7.27E-05 | -6.08E-03 | 4.87E-03 | -3.63E-04 | -1.98E-07 | -6.17E-08 | 2.65E-08 | 2.48E-08 |

FIG. 8

| system focal length=3.76mm, half field-of-view=34.84°, F-number=2.54, system length=4.87mm | | | | | | |
|---|---|---|---|---|---|---|
| lens element | surface | radius of curvature | thickness | refractive index | Abbe number | material | focal length |
| object | | ∞ | ∞ | | | | |
| aperture stop 2 | | ∞ | -0.100 | | | | |
| first lens element 3 | object-side surface 31 | 2.001013 | 0.7351 | 1.544919 | 55.92994 | plastic | 2.761 |
| | image-side surface 32 | -5.34374 | 0.085517 | | | | |
| second lens element 4 | object-side surface 41 | 10.8392 | 0.344635 | 1.639800 | 23.26587 | plastic | -5.996 |
| | image-side surface 42 | 2.814204 | 0.619544 | | | | |
| third lens element 5 | object-side surface 51 | -1.25448 | 0.721257 | 1.532402 | 56.06449 | plastic | 3.042 |
| | image-side surface 52 | -0.84962 | 0.035 | | | | |
| fourth lens element 6 | object-side surface 61 | 7.595313 | 0.486921 | 1.491756 | 57.44079 | plastic | -5.286 |
| | image-side surface 62 | 1.900108 | 0.0868 | | | | |
| fifth lens element 7 | object-side surface 71 | 2.168352 | 0.431954 | 1.639800 | 23.26587 | plastic | -8.312 |
| | image-side surface 72 | 1.423185 | 0.36 | | | | |
| optical filter 8 | object-side surface 81 | ∞ | 0.21 | | | | |
| | image-side surface 82 | ∞ | 0.750599 | | | | |
| image plane 9 | | ∞ | 0.000 | | | | |

FIG. 11

| surface | 31 | 32 | 41 | 42 | 51 | 52 | 61 | 62 | 71 | 72 |
|---|---|---|---|---|---|---|---|---|---|---|
| K | -2.66E+00 | 1.75E+00 | 6.20E+01 | 1.20E+00 | -4.50E+00 | -1.52E+00 | -5.13E+02 | -1.14E+01 | -6.16E-01 | -7.14E+00 |
| $a_4$ | 8.84E-04 | -1.39E-01 | -1.13E-02 | 1.13E-01 | -2.81E-01 | 2.59E-02 | 5.79E-02 | -1.19E-02 | -1.18E-01 | -5.26E-02 |
| $a_6$ | -5.24E-02 | 3.32E-02 | -4.00E-02 | -7.47E-02 | 2.84E-01 | -3.21E-02 | -2.81E-02 | 5.84E-03 | 2.42E-02 | 1.01E-02 |
| $a_8$ | 9.10E-03 | -1.17E-01 | -1.14E-01 | 2.94E-02 | -9.40E-02 | 3.74E-03 | 4.46E-03 | -4.59E-03 | -1.49E-03 | -7.51E-04 |
| $a_{10}$ | -8.20E-02 | 1.15E-01 | 3.15E-01 | 2.17E-02 | -1.26E-01 | 2.42E-02 | 4.02E-04 | 1.17E-03 | -1.58E-04 | 2.16E-04 |
| $a_{12}$ | 1.48E-02 | -5.80E-02 | -1.76E-01 | 3.71E-02 | 2.22E-01 | -8.46E-03 | -2.63E-04 | -1.30E-04 | 2.31E-05 | -4.41E-05 |
| $a_{14}$ | -2.78E-02 | -1.62E-02 | 1.55E-02 | -3.59E-02 | -1.18E-01 | -7.79E-04 | 2.68E-05 | 3.50E-06 | -9.11E-07 | 2.57E-06 |
| $a_{16}$ | 5.40E-02 | 2.03E-02 | -3.96E-03 | -2.06E-03 | -3.62E-03 | -1.21E-04 | 4.13E-08 | -1.94E-07 | -1.68E-08 | 2.51E-08 |

FIG. 12

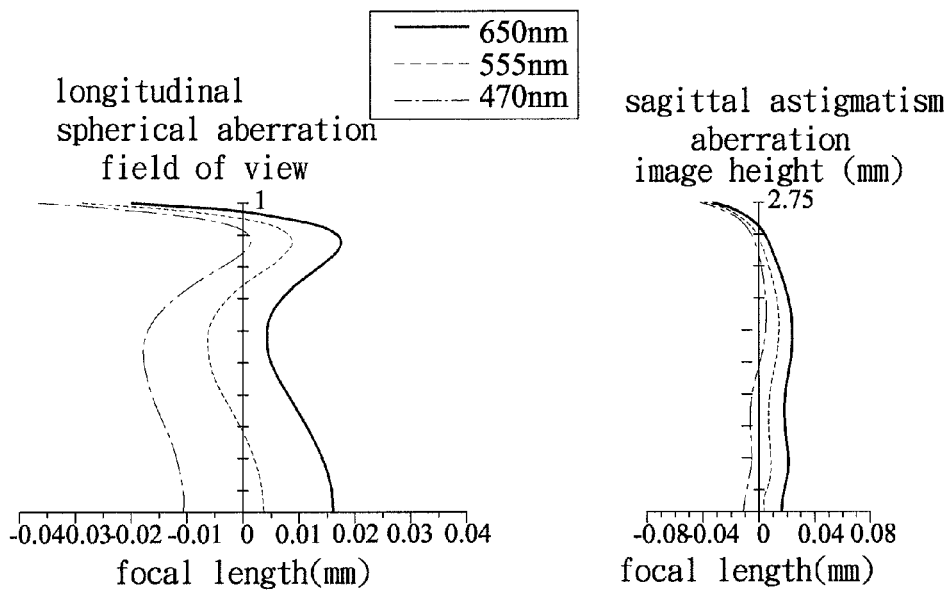
FIG. 13(a)
FIG. 13(b)
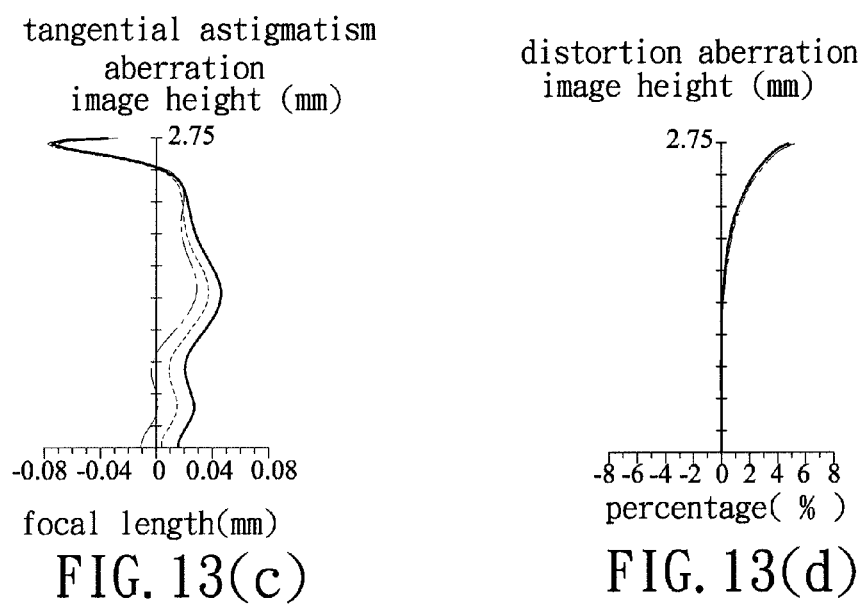
FIG. 13(c)
FIG. 13(d)

FIG. 15

| system focal length=4.01mm, half field-of-view=36.00°, F-number=2.68, system length=5.35mm | | | | | | |
|---|---|---|---|---|---|---|
| lens element | surface | radius of curvature | thickness | refractive index | Abbe number | material | focal length |
| object | | ∞ | ∞ | | | | |
| aperture stop 2 | | ∞ | -0.100 | | | | |
| first lens element 3 | object-side surface 31 | 2.140037 | 0.745282 | 1.544919 | 55.92994 | plastic | 2.794 |
| | image-side surface 32 | -4.67842 | 0.063748 | | | | |
| second lens element 4 | object-side surface 41 | 14.49554 | 0.40706 | 1.637460 | 23.23102 | plastic | -5.822 |
| | image-side surface 42 | 2.940459 | 0.619739 | | | | |
| third lens element 5 | object-side surface 51 | -1.28782 | 0.896591 | 1.532402 | 56.06449 | plastic | 3.016 |
| | image-side surface 52 | -0.8891 | 0.134261 | | | | |
| fourth lens element 6 | object-side surface 61 | 6.466613 | 0.382459 | 1.532402 | 56.06449 | plastic | -4.661 |
| | image-side surface 62 | 1.760604 | 0.388597 | | | | |
| fifth lens element 7 | object-side surface 71 | 2.155497 | 0.329969 | 1.637460 | 23.23102 | plastic | -14.508 |
| | image-side surface 72 | 1.645806 | 0.36 | | | | |
| optical filter 8 | object-side surface 81 | ∞ | 0.21 | | | | |
| | image-side surface 82 | ∞ | 0.812506 | | | | |
| image plane 9 | | | 0.000 | | | | |

| surface | 31 | 32 | 41 | 42 | 51 | 52 | 61 | 62 | 71 | 72 |
|---|---|---|---|---|---|---|---|---|---|---|
| K | -2.90E+00 | 2.88E+00 | 6.13E+01 | 1.04E+00 | -4.67E+00 | -1.56E+00 | -1.56E+03 | -1.61E+01 | -6.86E-01 | -5.39E+00 |
| $a_4$ | -1.81E-03 | -1.40E-01 | -1.14E-02 | 1.12E-01 | -2.86E-01 | 2.93E-02 | 5.40E-02 | -1.52E-02 | -1.20E-01 | -5.65E-02 |
| $a_6$ | -5.57E-02 | 2.74E-02 | -3.94E-02 | -7.29E-02 | 2.86E-01 | -3.29E-02 | -2.83E-02 | 5.60E-03 | 2.41E-02 | 9.33E-03 |
| $a_8$ | 7.01E-03 | -1.24E-01 | -1.17E-01 | 3.45E-02 | -8.86E-02 | 2.01E-03 | 4.44E-03 | -4.56E-03 | -1.51E-03 | -7.05E-04 |
| $a_{10}$ | -8.50E-02 | 1.19E-01 | 3.10E-01 | 2.49E-02 | -1.20E-01 | 2.34E-02 | 4.09E-04 | 1.16E-03 | -1.55E-04 | 2.21E-04 |
| $a_{12}$ | 2.51E-02 | -3.69E-02 | -1.73E-01 | 3.26E-02 | 2.25E-01 | -8.56E-03 | -2.59E-04 | -1.34E-04 | 2.49E-05 | -4.38E-05 |
| $a_{14}$ | -1.64E-02 | -6.34E-03 | 3.13E-02 | -4.13E-02 | -1.17E-01 | -5.57E-04 | 2.69E-05 | 3.43E-06 | -9.08E-07 | 2.55E-06 |
| $a_{16}$ | 9.57E-03 | 7.32E-03 | -1.06E-02 | -3.32E-03 | -5.65E-04 | 1.99E-04 | -1.68E-07 | 6.18E-08 | -4.49E-08 | -1.95E-08 |

FIG. 16

| relationship | first preferred embodiment | second preferred embodiment | third preferred embodiment | fourth preferred embodiment |
|---|---|---|---|---|
| CT3/CT2 | 3.63 | 2.10 | 2.09 | 2.20 |
| EFL/AC23 | 5.73 | 6.43 | 6.07 | 6.48 |
| ALT/CT1 | 3.22 | 2.25 | 3.70 | 3.71 |
| EFL/(AC12+CT2) | 13.85 | 11.96 | 8.74 | 8.53 |
| CT2/(AC12+AC45) | 0.90 | 2.14 | 2.00 | 0.90 |
| CT3/AC23 | 1.19 | 1.03 | 1.16 | 1.45 |
| CT3/AC34 | 15.79 | 9.63 | 20.61 | 6.68 |
| (CT4+CT5)/CT1 | 0.96 | 0.49 | 1.25 | 0.96 |
| ALT/(CT4+CT5) | 3.36 | 4.63 | 2.96 | 3.88 |
| AC23/(AC34+AC45) | 2.80 | 3.46 | 5.09 | 1.19 |
| AAG/AC23 | 1.44 | 1.34 | 1.33 | 1.95 |

FIG. 18

IMAGING LENS, AND PORTABLE ELECTRONIC APPARATUS INCLUDING THE SAME

CROSS-REFERENCE TO RELATED APPLICATION

This application claims priority to Taiwanese Application No. 102104614, filed on Feb. 6, 2013.

BACKGROUND OF THE INVENTION

1. Field of the Invention

The present invention relates to an imaging lens, and a portable electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

U.S. Pat. No. 8,000,031 discloses a conventional imaging lens with five lens elements. In a first embodiment disclosed therein, a distance between an object-side surface of a first lens element and an image plane is 6.499 mm.

U.S. Pat. No. 7,826,151 discloses a conventional imaging lens with five lens elements. In a first embodiment disclosed therein, a distance between an object-side surface of a first lens element and an image plane is 7.467 mm.

U.S. Pat. No. 7,502,181 discloses a conventional imaging lens with five lens elements. In a first embodiment disclosed therein, a distance between an object-side surface of a first lens element and an image plane is 8.267 mm.

The aforementioned conventional imaging lenses go against the trend toward reducing dimensions of mobile phones due to their longer system lengths.

SUMMARY OF THE INVENTION

Therefore, an object of the present invention is to provide an imaging lens having a shorter overall length while maintaining good optical performance.

According to one aspect of the present invention, an imaging lens comprises an aperture stop, first, second, third, fourth and fifth lens elements arranged from an object side to an image side in the given order. Each of the first, second, third, fourth and fifth lens elements has an object-side surface facing toward the object side and an image-side surface facing toward the image side.

The first lens element has a positive refractive power.

The image-side surface of the second lens element has a concave portion in a vicinity of a periphery of the second lens element.

The object-side surface of the third lens element has a concave portion in a vicinity of a periphery of the third lens element.

The object-side surface of the fourth lens element has a convex portion in a vicinity of an optical axis of the imaging lens. The image-side surface of the fourth lens element has a concave portion in a vicinity of the optical axis.

The fifth lens element is made of a plastic material, and the image-side surface thereof has a concave portion in a vicinity of the optical axis.

The imaging lens does not include any lens element with refractive power other than the first, second, third, fourth and fifth lens elements.

Another object of the present invention is to provide a portable electronic apparatus having an imaging lens with five lens elements.

According to another aspect of the present invention, a portable electronic apparatus includes a housing and an imaging module. The imaging module is disposed in the housing, and includes the imaging lens of the present invention, a barrel on which the imaging lens is disposed, a seat unit on which the barrel is disposed, and an image sensor disposed at the image side and operatively associated with the imaging lens for capturing images.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical parameters corresponding to the imaging lens of the first preferred embodiment;

FIG. 4 shows values of some parameters of an optical relationship corresponding to the imaging lens of the first preferred embodiment;

FIGS. 5($a$) to 5($d$) show different optical characteristics of the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIGS. 13($a$) to 13($d$) show different optical characteristics of the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 18 is a table that lists values of parameters of other optical relationships corresponding to the imaging lenses of the first to fourth preferred embodiments;

DETAILED DESCRIPTION OF THE PREFERRED EMBODIMENTS

Figure 1:
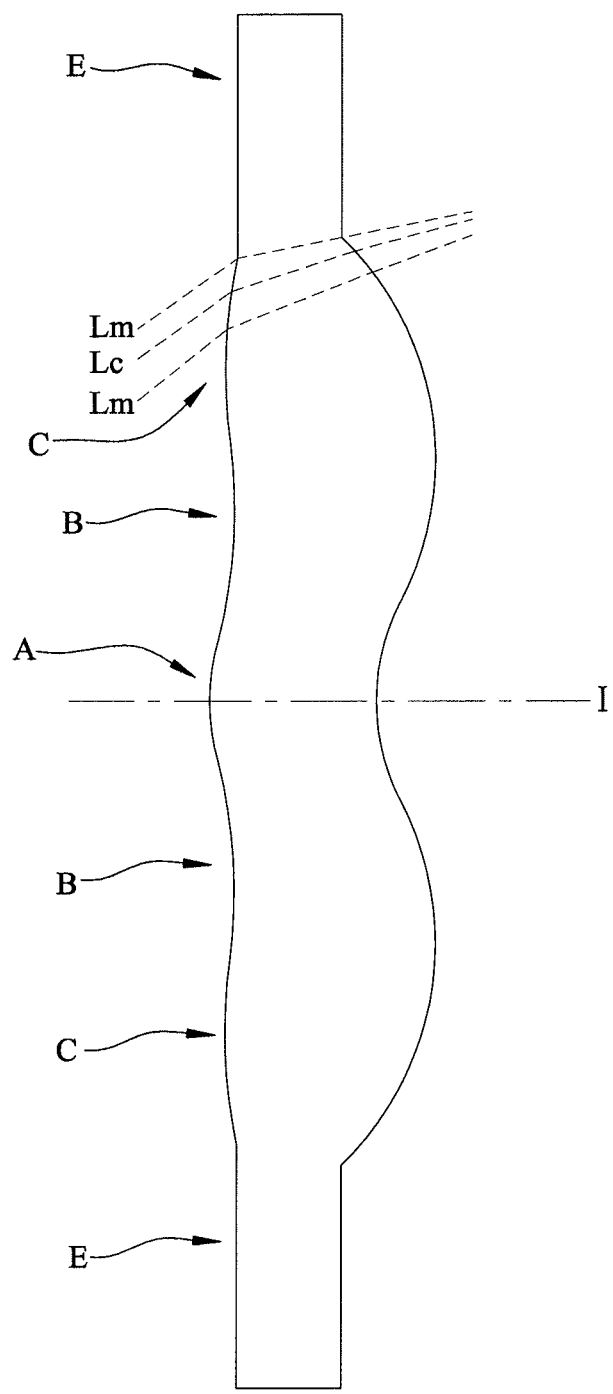
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
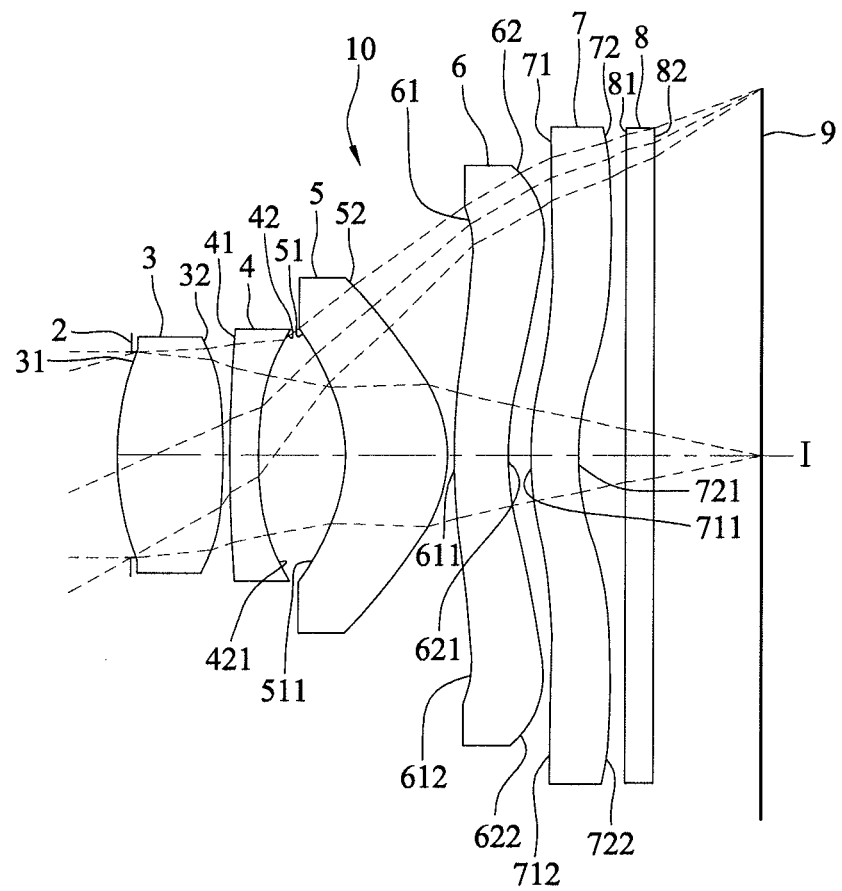
FIG. 2 is a schematic diagram that illustrates the first preferred embodiment of an imaging lens according to the present invention.

Referring to FIG. 2, the first preferred embodiment of an imaging lens 10 according to the present invention includes an aperture stop 2, first, second, third, fourth and fifth lens elements 3-7, and an optical filter 8 arranged in the given order along an optical axis (I) from an object side to an image side. The optical filter 8 is an infrared cut filter for selectively absorbing infrared light to thereby reduce imperfection of images formed at an image plane 9.

Each of the first, second, third, fourth and fifth lens elements 3-7 and the optical filter 8 has an object-side surface 31, 41, 51, 61, 71, 81 facing toward the object side, and an image-side surface 32, 42, 52, 62, 72, 82 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 81, 82 of the optical filter 8, in the given order, to form an image on the image plane 9. Each of the object-side surfaces 31, 41, 51, 61, 71 and the image-side surfaces 32, 42, 52, 62, 72 is aspherical and has a center point coinciding with the optical axis (I).

The lens elements 3-7 are made of a plastic material in this embodiment, and at least one of the lens elements 3-6 may be made of other materials in other embodiments.

In the first preferred embodiment, which is depicted in FIG. 2, the first lens element 3 has a positive refractive power. The object-side surface 31 of the first lens element 3 is a convex surface, and the image-side surface 32 of the first lens element 3 is a convex surface.

The second lens element 4 has a negative refractive power. The object-side surface 41 of the second lens element 4 is a convex surface. The image-side surface 42 of the second lens element 4 is a concave surface that has a concave portion 421 in a vicinity of a periphery of the second lens element 4.

The third lens element 5 has a positive refractive power. The object-side surface 51 of the third lens element 5 is a concave surface that has a concave portion 511 in a vicinity of a periphery of the third lens element 5. The image-side surface 52 of the third lens element 5 is a convex surface.

The fourth lens element 6 has a negative refractive power. The object-side surface 61 of the fourth lens element 6 has a convex portion 611 in a vicinity of the optical axis (I), and a concave portion 612 in a vicinity of a periphery of the fourth lens element 6. The image-side surface 62 of the fourth lens element 6 has a concave portion 621 in a vicinity of the optical axis (I), and a convex portion 622 in a vicinity of a periphery of the fourth lens element 6.

The fifth lens element 7 has a negative refractive power. The object-side surface 71 of the fifth lens element 7 has a convex portion 711 in a vicinity of the optical axis (I), and a concave portion 712 in a vicinity of a periphery of the fifth lens element 7. The image-side surface 72 of the fifth lens element 7 has a concave portion 721 in a vicinity of the optical axis (I), and a convex portion 722 in a vicinity of the periphery of the fifth lens element 7.

Shown in FIG. 3 is a table that lists values of some optical parameters corresponding to the surfaces 31-81, 32-82 of the first preferred embodiment. The imaging lens 10 has an overall system effective focal length (EFL) of 3.79 mm, a half field-of-view (HFOV) of 36.00°, an F-number of 2.45, and a system length of 4.92 mm. The system length refers to a distance between the object-side surface 31 of the first lens element 3 and the image plane 9.

In this embodiment, each of the object-side surfaces 31-71 and the image-side surfaces 32-72 is aspherical, and satisfies the optical relationship of $$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

where:

R represents a radius of curvature of the aspherical surface;

Z represents a depth of an aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_{2i}$ represents a $2i^{th}$ aspherical coefficient.

Shown in FIG. 4 is a table that lists values of some optical parameters of the aforementioned optical relationship (1) corresponding to the first preferred embodiment.

Relationships among some of the aforementioned optical parameters corresponding to the first preferred embodiment are as follows:

$CT3/CT2=3.63$ $EFL/AC23=5.73$ $ALT/CT1=3.22$ $EFL/(AC12+CT2)=13.85$ $CT2/(AC12+AC45)=0.90$ $CT3/AC23=1.19$ $CT3/AC34=15.79$ $(CT4+CT5)/CT1=0.96$ $ALT/(CT4+CT5)=3.36$ $AC23/(AC34+AC45)=2.80$ $AAG/AC23=1.44$ where:

CT1 represents a distance between the object-side surface 31 and the image-side surface 32 of the first lens element 3 at the optical axis (I);

CT2 represents a distance between the object-side surface 41 and the image-side surface 42 of the second lens element 4 at the optical axis (I);

CT3 represents a distance between the object-side surface 51 and the image-side surface 52 of the third lens element 5 at the optical axis (I);

CT4 represents a distance between the object-side surface 61 and the image-side surface 62 of the fourth lens element 6 at the optical axis (I);

CT5 represents a distance between the object-side surface 71 and the image-side surface 72 of the fifth lens element 7 at the optical axis (I);

ALT represents a sum of the distance between the object-side surface 31 and the image-side surface 32 of the first lens element 3 at the optical axis (I), the distance between the object-side surface 41 and the image-side surface 42 of the second lens element 4 at the optical axis (I), the distance between the object-side surface 51 and the image-side surface 52 of the third lens element 5 at the optical axis (I), the distance between the object-side surface 61 and the image-side surface 62 of the fourth lens element 6 at the optical axis (I), and the distance between the object-side surface 71 and the image-side surface 72 of the fifth lens element 7 at the optical axis (I);

AAG represents a sum of a distance between the image-side surface 32 of the first lens element 3 and the object-side surface 41 of the second lens element 4 at the optical axis (I), a distance between the image-side surface 42 of the second lens element 4 and the object-side surface 51 of the third lens element 5 at the optical axis (I), a distance between the image-side surface 52 of the third lens element 5 and the object-side surface 61 of the fourth lens element 6 at the optical axis (I), and a distance between the image-side surface 62 of the fourth lens element 6 and the object-side surface 71 of the fifth lens element 7 at the optical axis (I);

EFL represents an effective focal length of the imaging lens 10;

AC12 represents the distance between the image-side surface 32 of the first lens element 3 and the object-side surface 41 of the second lens element 4 at the optical axis (I);

AC23 represents the distance between the image-side surface 42 of the second lens element 4 and the object-side surface 51 of the third lens element 5 at the optical axis (I);

AC34 represents the distance between the image-side surface 52 of the third lens element 5 and the object-side surface 61 of the fourth lens element 6 at the optical axis (I); and AC45 represents the distance between the image-side surface 62 of the fourth lens element 6 and the object-side surface 71 of the fifth lens element 7 at the optical axis (I).

FIGS. 5($a$) to 5($d$) show simulation results corresponding to longitudinal spherical aberration, sagittal astigmatism aberration, tangential astigmatism aberration, and distortion aberration of the first preferred embodiment, respectively. In each of the simulation results, curves corresponding respectively to wavelengths of 486 nm, 588 nm, and 656 nm are shown.

It can be understood from FIG. 5($a$) that, since each of the curves corresponding to longitudinal spherical aberration has a focal length at each field of view (indicated by the vertical axis) that falls within the range of ±0.03 mm, the first preferred embodiment is able to achieve a relatively low spherical aberration at each of the wavelengths. Furthermore, since a deviation in focal length among the curves at each field of view does not exceed the range of ±0.025 mm, the first preferred embodiment has a relatively low chromatic aberration.

It can be understood from FIGS. 5($b$) and 5($c$) that, since each of the curves falls within the range of ±0.08 mm of focal length, the first preferred embodiment has a relatively low optical aberration.

Moreover, as shown in FIG. 5($d$), since each of the curves corresponding to distortion aberration falls within the range of ±1.6%, the first preferred embodiment is able to meet requirements in imaging quality of most optical systems.

In view of the above, even with the system length reduced down to 4.92 mm, the imaging lens 10 of the first preferred embodiment is still able to achieve a relatively good optical performance.

Figure 6:
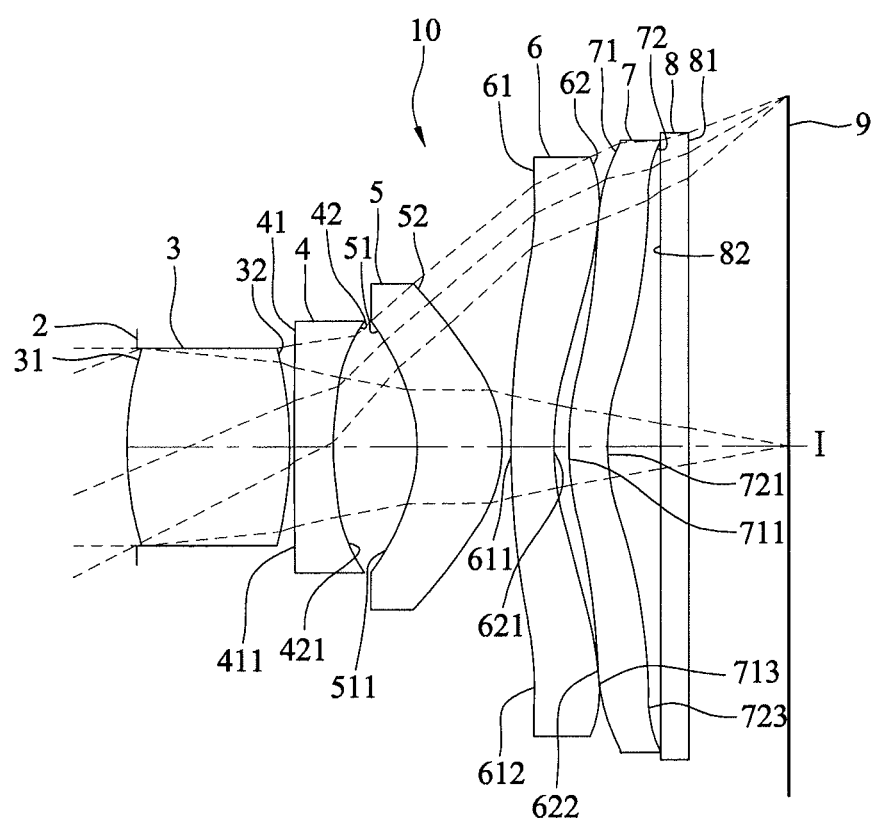
FIG. 6 is a schematic diagram that illustrates the second preferred embodiment of an imaging lens according to the present invention.
Figure 9A:
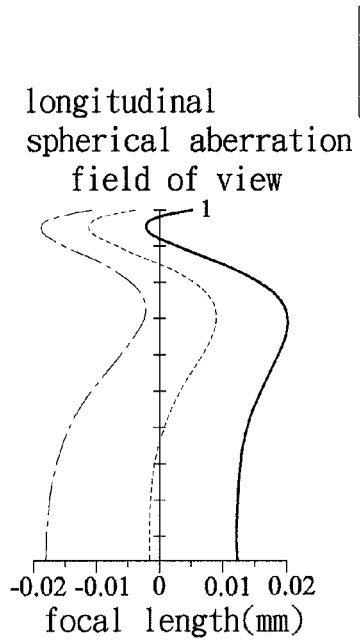
FIGS. 9($a$) to 9($d$) show different optical characteristics of the imaging lens of the second preferred embodiment.
Figure 9B:
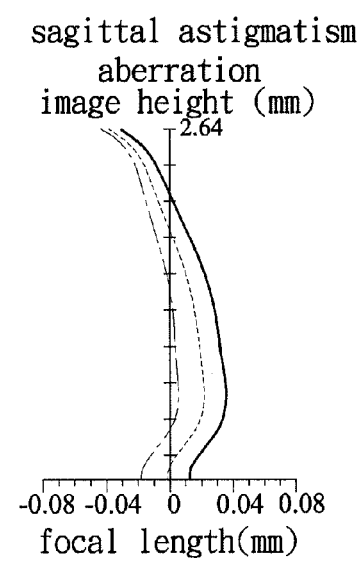
Figure 9C:
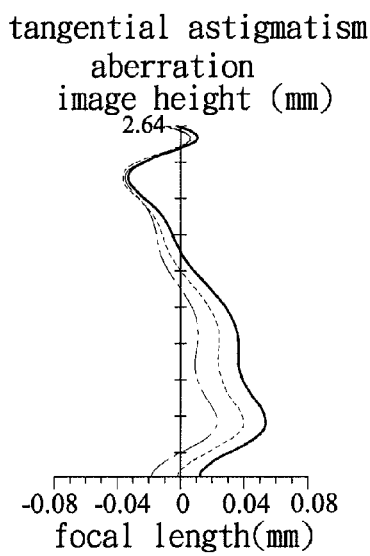
Figure 9D:
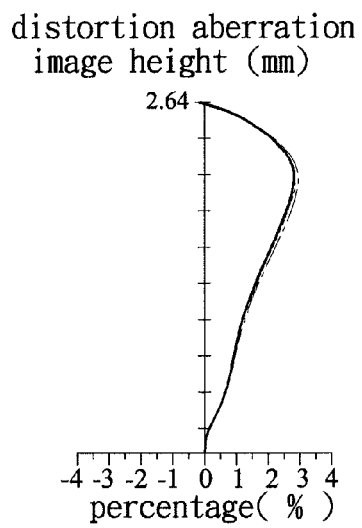

Referring to FIG. 6, the differences between the first and second preferred embodiments of the imaging lens 2 of this invention reside in that:

The object-side surface 41 of the second lens element 4 has a concave portion 411 in a vicinity of a periphery of the second lens element 4. The object-side surface 71 of the fifth lens element 7 is a convex surface that has a convex portion 713 in a vicinity of a periphery of the fifth lens element 7. The image-side surface 72 of the fifth element 7 is a concave surface that has a concave portion 723 in a vicinity of the periphery of the fifth lens element 7.

Shown in FIG. 7 is a table that lists values of some optical parameters corresponding to the surfaces 31-81, 32-82 of the second preferred embodiment. The imaging lens 10 has an overall system focal length of 4.06 mm, an HFOV of 33.00°, an F-number of 2.70, and a system length of 5.05 mm.

Shown in FIG. 8 is a table that lists values of some optical parameters of the aforementioned optical relationship (1) corresponding to the second preferred embodiment.

Relationships among some of the aforementioned optical parameters corresponding to the second preferred embodiment are as follows:

$CT3/CT2=2.10$ $EFL/AC23=6.43$ $ALT/CT1=2.25$ $EFL/(AC12+CT2)=11.96$ $CT2/(AC12+AC45)=2.14$ $CT3/AC23=1.03$ $CT3/AC34=9.63$ $(CT4+CT5)/CT1=0.49$ $ALT/(CT4+CT5)=4.63$ $AC23/(AC34+AC45)=3.46$ $AAG/AC23=1.34$

FIGS. 9(a) to 9(d) show simulation results corresponding to longitudinal spherical aberration, sagittal astigmatism aberration, tangential astigmatism aberration, and distortion aberration of the second preferred embodiment, respectively. It can be understood from FIGS. 9(a), 9(b), 9(c) and 9(d) that the second preferred embodiment is able to achieve a relatively good optical performance even with the system length reduced down to 5.05 mm.

Figure 10:
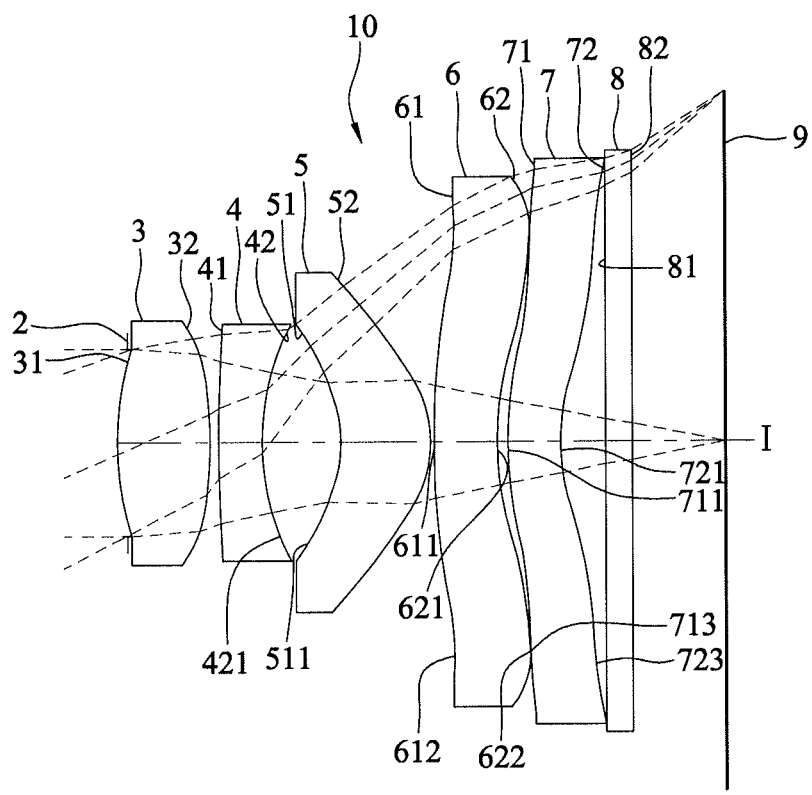
FIG. 10 is a schematic diagram that illustrates the third preferred embodiment of an imaging lens according to the present invention.

Referring to FIG. 10, the differences between the first and third preferred embodiments of the imaging lens 2 of this invention reside in that:

The object-side surface 71 of the fifth lens element 7 is a convex surface that has a convex portion 713 in a vicinity of a periphery of the fifth lens element 7. The image-side surface 72 of the fifth lens element 7 is a concave surface that has a concave portion 723 in a vicinity of the periphery of the fifth lens element 7.

Shown in FIG. 11 is a table that lists values of some optical parameters corresponding to the surfaces 31-81, 32-82 of the third preferred embodiment. The imaging lens 10 has an overall system focal length of 3.76 mm, an HFOV of 34.84°, an F-number of 2.54, and a system length of 4.87 mm.

Shown in FIG. 12 is a table that lists values of some optical parameters of the aforementioned optical relationship (1) corresponding to the third preferred embodiment.

Relationships among some of the aforementioned optical parameters corresponding to the third preferred embodiment are as follows:

$CT3/CT2=2.09$ $EFL/AC23=6.07$ $ALT/CT1=3.70$ $EFL/(AC12+CT2)=8.74$ $CT2/(AC12+AC45)=2.00$ $CT3/AC23=1.16$ $CT3/AC34=20.61$ $(CT4+CT5)/CT1=1.25$ $ALT/(CT4+CT5)=2.96$ $AC23/(AC34+AC45)=5.09$ $AAG/AC23=1.33$

FIGS. 13(a) to 13(d) show simulation results corresponding to longitudinal spherical aberration, sagittal astigmatism aberration, tangential astigmatism aberration, and distortion aberration of the third preferred embodiment, respectively. It can be understood from FIGS. 13(a), 13(b), 13(c) and 13(d) that the third preferred embodiment is likewise able to achieve a relatively good optical performance even with the system length reduced down to 4.87 mm.

Figure 14:
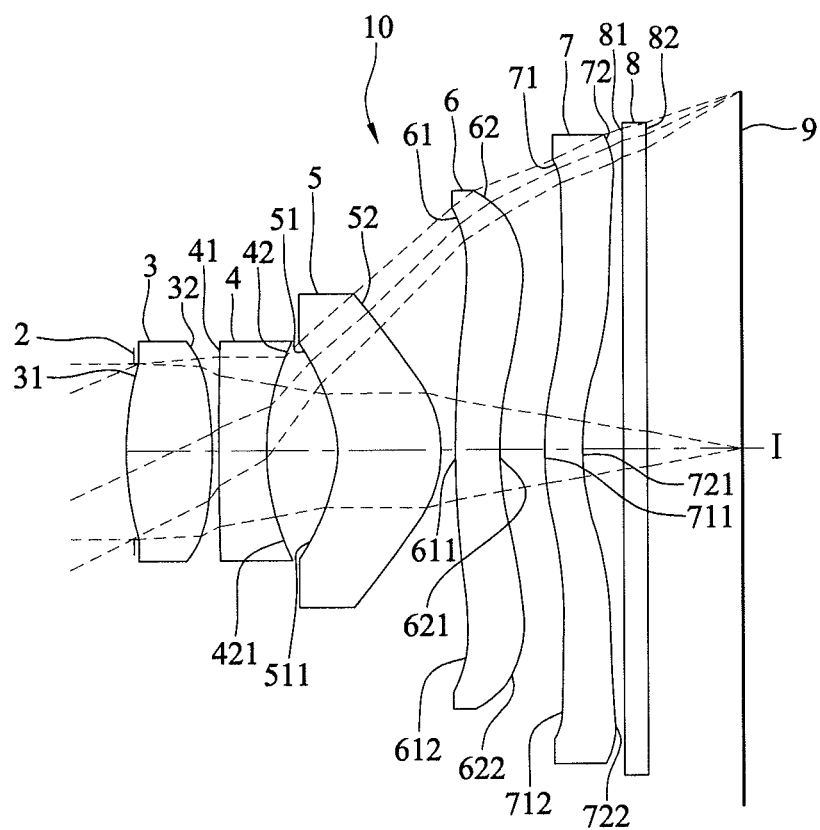
FIG. 14 is a schematic diagram that illustrates the fourth preferred embodiment of an imaging lens according to the present invention.
Figure 17A:
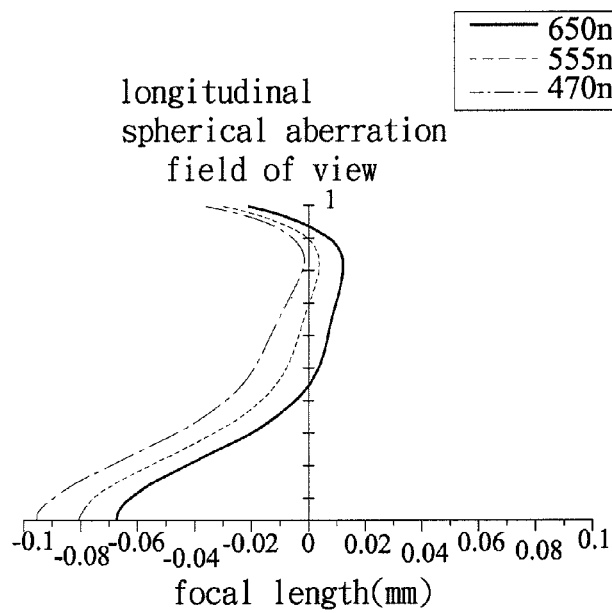
FIGS. 17($a$) to 17($d$) show different optical characteristics of the imaging lens of the fourth preferred embodiment.
Figure 17B:
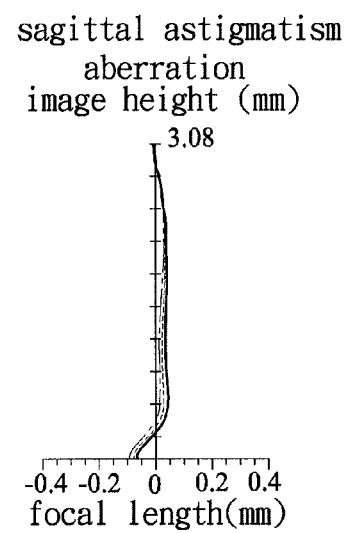
Figure 17C:
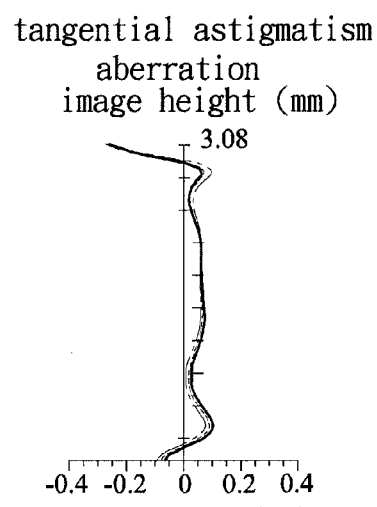
Figure 17D:
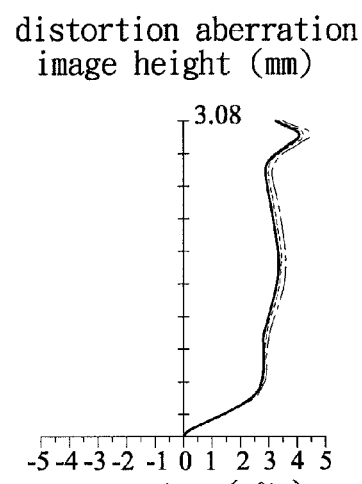

FIG. 14 illustrates the fourth preferred embodiment of an imaging lens 10 according to the present invention, which has a configuration similar to that of the first preferred embodiment.

Shown in FIG. 15 is a table that lists values of some optical parameters corresponding to the surfaces 31-81, 32-82 of the fourth preferred embodiment. The imaging lens 10 has an overall system focal length of 4.01 mm, an HFOV of 36.00°, an F-number of 2.68, and a system length of 5.35 mm.

Shown in FIG. 16 is a table that lists values of some optical parameters of the aforementioned optical relationship (1) corresponding to the fourth preferred embodiment.

Relationships among some of the aforementioned optical parameters corresponding to the fourth preferred embodiment are as follows:

$CT3/CT2=2.20$ $EFL/AC23=6.48$ $ALT/CT1=3.71$ $EFL/(AC12+CT2)=8.53$ $CT2/(AC12+AC45)=0.90$ $CT3/AC23=1.45$ $CT3/AC34=6.68$ $(CT4+CT5)/CT1=0.96$ $ALT/(CT4+CT5)=3.88$ $AC23/(AC34+AC45)=1.19$ $AAG/AC23=1.95$

FIGS. 17(a) to 17(d) show simulation results corresponding to longitudinal spherical aberration, sagittal astigmatism aberration, tangential astigmatism aberration, and distortion aberration of the fourth preferred embodiment, respectively. It can be understood from FIGS. 17(a), 17(b), 17(c) and 17(d) that the fourth preferred embodiment is likewise able to achieve a relatively good optical performance even with the system length reduced down to 5.35 mm.

Shown in FIG. 18 is a table that lists the aforesaid relationships among some of the aforementioned optical parameters corresponding to the four preferred embodiments for comparison. When each of the optical parameters of the imaging lens 10 according to this invention satisfies the following optical relationships, the optical performance is still relatively good even with the reduced system length:

| | |
|---|---:|
| $EFL/AC23 \geq 5.70$ | (2) |
| $EFL/(AC12+CT2) \geq 8.50$ | (3) |
| $CT3/AC23 \leq 1.45$ | (4) |
| $ALT/CT1 \leq 3.75$ | (5) |
| $CT2/(AC12+AC45) \geq 0.90$ | (6) |
| $(CT4+CT5)/CT1 \leq 1.25$ | (7) |
| $AC23/(AC34+AC45) \geq 2.60$ | (8) |
| $CT3/CT2 \geq 1.85$ | (9) |

$$CT3/AC34 \geq 11.00 \tag{10}$$

$$ALT/(CT4+CT5) \geq 2.90 \tag{11}$$

$$AAG/AC23 \leq 2.10 \tag{12}$$

Smaller EFL and shorter distances between the adjacent lens elements favor reduction of the system length. When the relationship (2) is satisfied, AC23 may fall within a suitable range without being too large. Preferably, EFL/AC23 ranges between 5.70 and 8.00.

When the relationship (3) is satisfied, each of AC12 and CT2 may fall within a suitable range without being too large. Preferably, EFL/(AC12+CT2) ranges between 8.50 and 15.00.

To reduce the system length, CT3 and AC23 may be reduced. Compared to the thickness of the third lens element 5, reduction of AC23 is relatively small. When the relationship (4) is satisfied, each of CT3 and AC23 may fall within a suitable range that favors reduction of the system length. Preferably, CT3/AC23 ranges between 1.00 and 1.45.

Since the first lens element 3 has the positive refractive power, reduction of the thickness of the first lens element 3 is relatively small. When the relationship (5) is satisfied, each of CT1 and ALT may fall within a suitable range that favors reduction of the system length. Preferably, ALT/CT1 ranges between 1.50 and 3.75.

To reduce the system length, the thickness of each lens element and the distances between the adjacent lens elements may be reduced. When the relationship (6) is satisfied, AC12 and AC45 will not be too large and favor reduction of the system length. Preferably, CT2/(AC12+AC45) ranges between 0.90 and 4.00.

Since the fourth lens element 6 and the fifth lens element 7 have a relatively large optical effective radius, the thickness of each of them should not be too small for facilitating manufacturing. However, a large thickness does not favor reduction of the system length. When the relationship (7) is satisfied, each of CT4 and CT5 may fall within a suitable range that favors reduction of the system length. Preferably, (CT4+CT5)/CT1 ranges between 0.40 and 1.25.

Since the image-side surface 42 of the second lens element 4 has the concave portion 421 in the vicinity of the periphery of the second lens element 4, and the object-side surface 51 of the third lens element 5 has the concave portion 511 in the vicinity of the periphery of the third lens element 5, AC23 is allowed to be slightly larger. Compared to AC23, reduction of each of AC34 and AC45 is relatively larger. When the relationship (8) is satisfied, AC23, AC34 and AC45 may fall within suitable ranges that favor reduction of the system length. Preferably, AC23/(AC34+AC45) ranges between 2.60 and 7.00.

To reduce the system length, the thickness of each of the lens elements may be reduced. Compared to the second lens element 4, reduction of the thickness of the third lens element 5 may be larger. When the relationship (9) is satisfied, each of CT2 and CT3 may fall within a suitable range that favors reduction of the system length. Preferably, CT3/CT2 ranges between 1.85 and 5.00.

To reduce the system length, the distances between the adjacent lens elements may be reduced, and reduction of AC34 may be relatively larger. When the relationship (10) is satisfied, each of CT3 and AC34 may fall within a suitable range that favors reduction of the system length. Preferably, CT3/AC34 ranges between 11.00 and 22.00.

Since the fourth lens element 6 and the fifth lens element 7 have a relatively large optical effective radius, the thickness of each of them should not be too small for facilitating manufacturing. However, a large thickness does not favor reduction of the system length. When the relationship (11) is satisfied, each of CT4 and CT5 may fall within a suitable range that favors reduction of the system length. Preferably, ALT/(CT4+CT5) ranges between 2.90 and 6.50.

When the relationship (12) is satisfied, each of AAG and AC23 may fall within a suitable range without being too large so as to favor reduction of the system length. Preferably, AAG/AC23 ranges between 1.00 and 2.10.

To sum up, effects and advantages of the imaging lens 10 according to the present invention are described hereinafter.

1. The positive refractive power of the first lens element 3 may enhance converging capability, so as to reduce a chief ray angle of imaging light at a periphery of the sensor, thereby producing parallel light input and ensuring non-distortion of the image.

2. Since the image-side surface 42 of the second lens element 4 has the concave portion 421 in the vicinity of the periphery of the second lens element 4, and the object-side surface 51 of the third lens element 5 has the concave portion 511 in the vicinity of the periphery of the third lens element 5, image aberration may thus be corrected, so as to ensure image quality at the edge of the image.

3. The fourth lens element 6 has the object-side surface 61 that has the convex portion 611 in the vicinity of the optical axis (I), and has the image-side surface 62 that has the concave portion 621 in the vicinity of the optical axis (I), resulting in better correction of the image aberration.

4. The image-side surface 72 of the fifth lens element 7 has the concave portion 721 in the vicinity of the optical axis (I). Through further cooperation with the convex portion 722 that is in the vicinity of the periphery of the fifth lens element 7, image quality could be promoted.

5. Through design of the relevant optical parameters, such as EFL/AC23, EFL/(AC12+CT2), CT3/AC23, ALT/CT1, CT2/(AC12+AC45), (CT4+CT5)/CT1, AC23/(AC34+AC45), CT3/CT2, CT3/AC34, ALT/(CT4+CT5) and AAG/AC23, optical aberrations, such as spherical aberration, may be reduced or even eliminated. Further, through surface design and arrangement of the lens elements 3-7, even when the system length is reduced, optical aberrations may still be reduced or eliminated, resulting in relatively good optical performance.

6. Through the aforesaid four preferred embodiments, it is known that the system length of this invention may be reduced down to below 6 mm, so as to facilitate developing thinner relevant products with economic benefits.

Figure 19:
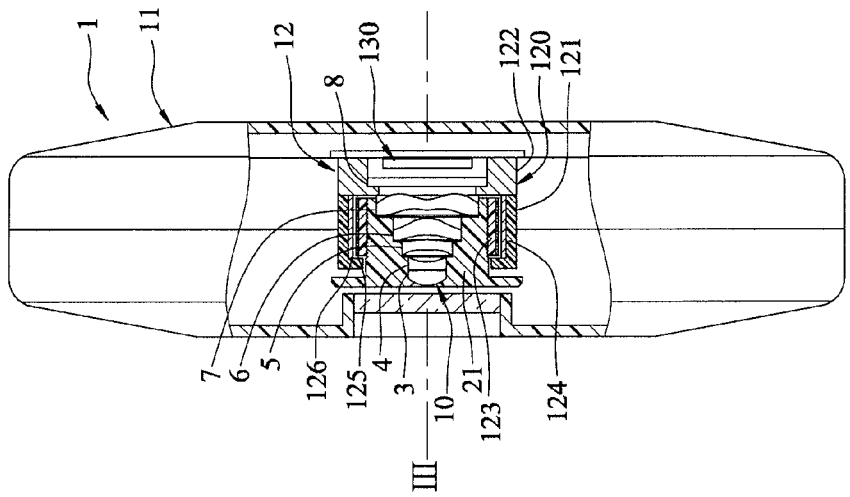
FIG. 19 is a schematic partly sectional view to illustrate a first exemplary application of the imaging lens of the present invention.

Shown in FIG. 19 is a first exemplary application of the imaging lens 10, in which the imaging lens 10 is disposed in a housing 11 of a portable electronic apparatus 1 (such as a mobile phone), and forms a part of an imaging module 12 of the portable electronic apparatus 1. The imaging module 12 includes a barrel 21 on which the imaging lens 10 is disposed, a seat unit 120 on which the barrel 21 is disposed, and an image sensor 130 disposed at the image plane 9 (see FIG. 2) and operatively associated with the imaging lens 10 for capturing images.

The seat unit 120 includes a first seat portion 121 in which the barrel 21 is disposed, and a second seat portion 122 having a portion interposed between the first seat portion 121 and the image sensor 130. The barrel 21 and the first seat portion 121 of the seat unit 120 extend along an axis (II), which coincides with the optical axis (I) of the imaging lens 10.

Figure 20:
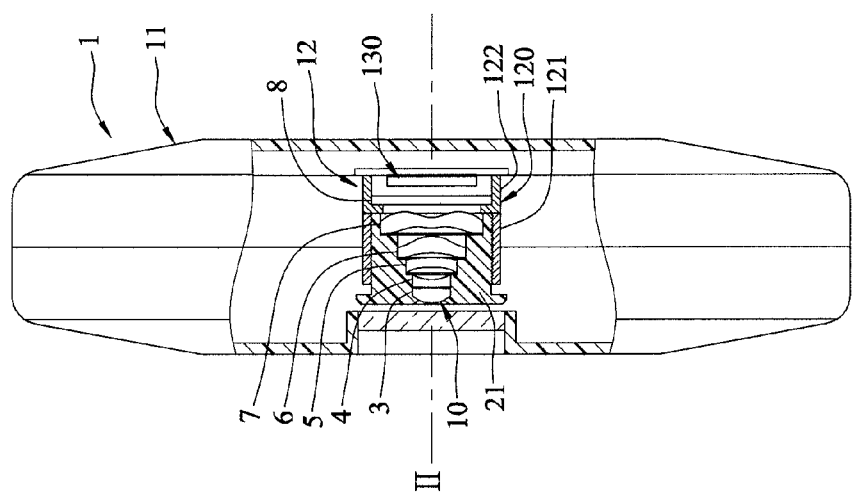
FIG. 20 is a schematic partly sectional view to illustrate a second exemplary application of the imaging lens of the present invention.

Shown in FIG. 20 is a second exemplary application of the imaging lens 10. The differences between the first and second exemplary applications reside in that, in the second exemplary application, the seat unit 120 is configured as a voicecoil motor (VCM), and the first seat portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10, for focus control of the imaging lens 10. The optical filter 8 of the imaging lens 10 is disposed at the second seat portion 122, which is disposed to abut against the outer section 124. Configuration and arrangement of other components of the portable electronic apparatus 1 in the second exemplary application are identical to those in the first exemplary application, and hence will not be described hereinafter for the sake of brevity.

By virtue of the imaging lens 10 of the present invention, the portable electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising an aperture stop, first, second, third, fourth and fifth lens elements arranged from an object side to an image side in the given order, each of said first, second, third, fourth and fifth lens elements having an object-side surface facing toward the object side and an image-side surface facing toward the image side, wherein:
   said first lens element has a positive refractive power;
   said image-side surface of said second lens element has a concave portion in a vicinity of a periphery of said second lens element;
   said object-side surface of said third lens element has a concave portion in a vicinity of a periphery of said third lens element;
   said object-side surface of said fourth lens element has a convex portion in a vicinity of an optical axis of said imaging lens, and said image-side surface of said fourth lens element has a concave portion in a vicinity of the optical axis; and
   said fifth lens element is made of a plastic material, and said image-side surface thereof has a concave portion in a vicinity of the optical axis;
   wherein said imaging lens does not include any lens element with refractive power other than said first, second, third, fourth and fifth lens elements;
   where said imaging lens satisfies EFL/AC23≥5.70, ALT/CT1≤3.75 and ALT/(CT4+CT5)≥2.90,
   where EFL represents an effective focal length of said imaging lens,
   where AC23 represents a distance between said image-side surface of said second lens element and said object-side surface of said third lens element at the optical axis,
   where ALT represents a sum of a distance between said object-side surface and said image-side surface of said first lens element at the optical axis, the distance between said object-side surface and said image-side surface of said second lens element at the optical axis, the distance between said object-side surface and said image-side surface of said third lens element at the optical axis, a distance between said object-side surface and said image-side surface of said fourth lens element at the optical axis, and a distance between said object-side surface and said image-side surface of said fifth lens element at the optical axis,
   where CT1 represents the distance between said object-side surface and said image-side surface of said first lens element at the optical axis,
   where CT4 represents the distance between said object-side surface and said image-side surface of said fourth lens element at the optical axis, and
   where CT5 represents the distance between said object-side surface and said image-side surface of said fifth lens element at the optical axis.

2. The imaging lens as claimed in claim 1, further satisfying EFL/(AC12+CT2)≥8.50, where AC12 represents a distance between said image-side surface of said first lens element and said object-side surface of said second lens element at the optical axis, and CT2 represents a distance between said object-side surface and said image-side surface of said second lens element at the optical axis.

3. The imaging lens as claimed in claim 2, further satisfying CT3/AC23≤1.45, where CT3 represents a distance between said object-side surface and said image-side surface of said third lens element at the optical axis.

4. The imaging lens as claimed in claim 1, further satisfying CT2/(AC12+AC45)≥0.90, where CT2 represents a distance between said object-side surface and said image-side surface of said second lens element at the optical axis, AC12 represents a distance between said image-side surface of said first lens element and said object-side surface of said second lens element at the optical axis, and AC45 represents a distance between said image-side surface of said fourth lens element and said object-side surface of said fifth lens element at the optical axis.

5. The imaging lens as claimed in claim 4, further satisfying (CT4+CT5)/CT1≤1.25.

6. The imaging lens as claimed in claim 5, further satisfying AC23/(AC34+AC45)≥2.60, where AC34 represents a distance between said image-side surface of said third lens element and said object-side surface of said fourth lens element at the optical axis.

7. The imaging lens as claimed in claim 1, satisfying EFL/(AC12+CT2)≥8.50, where AC12 represents a distance between said image-side surface of said first lens element and said object-side surface of said second lens element at the optical axis, and CT2 represents a distance between said object-side surface and said image-side surface of said second lens element at the optical axis.

8. The imaging lens as claimed in claim 7, further satisfying CT3/CT2≥1.85, where CT3 represents a distance between said object-side surface and said image-side surface of said third lens element at the optical axis.

9. The imaging lens as claimed in claim 8, further satisfying AC23/(AC34+AC45)≥2.60, where AC34 represents a distance between said image-side surface of said third lens element and said object-side surface of said fourth lens element at the optical axis, and AC45 represents a distance between said image-side surface of said fourth lens element and said object-side surface of said fifth lens element at the optical axis.

10. The imaging lens as claimed in claim 9, further satisfying AAG/AC23≤2.10, where AAG represents a sum of the distance between said image-side surface of said first lens element and said object-side surface of said second lens element at the optical axis, the distance between said image-side surface of said second lens element and said object-side surface of said third lens element at the optical axis, the distance between said image-side surface of said third lens element and said object-side surface of said fourth lens element at the optical axis, and the distance between said image-side surface of said fourth lens element and said object-side surface of said fifth lens element at the optical axis.

11. The imaging lens as claimed in claim 1, satisfying $CT2/(AC12+AC45) \geq 0.90$, where CT2 represents a distance between said object-side surface and said image-side surface of said second lens element at the optical axis, AC12 represents a distance between said image-side surface of said first lens element and said object-side surface of said second lens element at the optical axis, and AC45 represents a distance between said image-side surface of said fourth lens element and said object-side surface of said fifth lens element at the optical axis.

12. The imaging lens as claimed in claim 11, further satisfying $CT3/AC34 \leq 11.00$, where CT3 represents a distance between said object-side surface and said image-side surface of said third lens element at the optical axis, and AC34 represents a distance between said image-side surface of said third lens element and said object-side surface of said fourth lens element at the optical axis.

13. The imaging lens as claimed in claim 12, further satisfying $AC23/(AC34+AC45) \geq 2.60$.

14. A portable electronic apparatus comprising:
a housing; and
an imaging module disposed in said housing, and including an imaging lens as claimed in claim 1, a barrel on which said imaging lens is disposed, a seat unit on which said barrel is disposed, and an image sensor disposed at the image side and operatively associated with said imaging lens for capturing images.

15. The portable electronic apparatus as claimed in claim 14, wherein said seat unit includes a first seat portion including an inner section in which said barrel is disposed, and an outer section that surrounds said inner section, said inner section of said first seat portion, said barrel, and said imaging lens being movable together with respect to said image sensor along the optical axis.

16. The portable electronic apparatus as claimed in claim 15, wherein said seat unit further includes a second seat portion, which is disposed between said outer section of said first seat portion and said image sensor, and which is disposed to abut against said outer section.

* * * * *